April 1, 1958

A. L. JUDSON 2,828,628

GYROSCOPE ERECTION SYSTEM

Filed April 25, 1955

INVENTOR.
Albert L. Judson
BY
AGENT

April 1, 1958  A. L. JUDSON  2,828,628
GYROSCOPE ERECTION SYSTEM
Filed April 25, 1955  2 Sheets-Sheet 2

INVENTOR
Albert L. Judson
BY
AGENT

United States Patent Office 2,828,628
Patented Apr. 1, 1958

2,828,628

GYROSCOPE ERECTION SYSTEM

Albert L. Judson, Portland, Oreg., assignor to Iron Fireman Manufacturing Company, Portland, Oreg.

Application April 25, 1955, Serial No. 503,757

9 Claims. (Cl. 74—5.41)

This invention relates to gyroscopes of the type called gyro verticals in which the wheel of the gyro spins on a vertical axis journalled in an inner gimbal, commonly called a case. The inner gimbal or case is journalled on a transverse normally horizontal axis sometimes called the pitch axis in an outer gimbal which in turn is journalled on a fore and aft normally horizontal axis sometimes called the roll axis in a platform or frame.

The gyro vertical to which this invention relates is for the purpose of providing signals indicating the degree of divergence of the frame from perpendicularity with the spin axis about either or both the pitch axis or the roll axis. The method of generating and transmitting the information of divergence by so-called "pick-off" or "synchro" transmitters is well known in the art and not part of this invention so will not further be described.

For various reasons well known in the art, if the gyro vertical is moving about the earth in random directions and at varying speeds, as in an airplane, the gyro will not of its own accord maintain its spin axis in a truly vertical position with respect to the center of the earth. For the purpose for which the gyro vertical is to be used it is necessary to provide the gyro with gravity sensing means and means controlled by the gravity sensing means continuously to urge the spin axis towards the true gravity vertical position. Without such restoring means the drift of the spin axis away from the gravity vertical position will be slow but may be cumulative to a degree which will make the instrument useless for its purpose.

Should an airplane on which the gyro vertical is mounted for its intended use be changing speed or direction rapidly or for a prolonged length of time the acceleration forces on the gravity sensing means of the gyro may even be greater than the normal force of gravity acting on the gyro and probably will be in a direction at variance with that of the normal force of gravity. For this reason it is usually desirable to free the gyro of all external restraint during such maneuvers and when the unusual condition is over to again put the gyro under the control of the gravity sensing means.

Again in normal operation with the gyro under control of the gravity sensing means the drift of the spin axis away from the gravity vertical position will be slow and only minimum restoring forces are required continuously to return it to the gravity vertical. However after severe maneuvers as above described even though the gyro is cut free from the control of the gravity sensing means it may be that at the end of the maneuver the spin axis will be well away from the gravity vertical position and it will be desirable to bring it back to the gravity vertical position in a hurry. For this purpose it is desirable to apply an increased restoring force under the control of the gravity sensing means.

Or it may be that during a maneuver of high acceleration the gyro case may be substantially inverted so as not to respond properly to the gravity sensing control when the control is again applied. In such case it is desirable to have means for sensing this condition and first restoring the upper end of the spin axle to the upper hemisphere of its possible path before the normal type of control is applied.

The process of bringing the spin axis of the gyro back to its gravity vertical position is known as gyroscope erection and this invention relates particularly to a unique and novel improvement in gyro erection systems.

It is the principal object of this invention to provide a gyro erection system which operates at a moderate restoring rate under normal operation, which can be made completely inoperative when desired, which operates at a faster restoring rate when required and which will sense an inversion of the spin axis and restore the spin axis to within the range of the normal erecting forces of the system as a preliminary to either normal or fast erection to the gravity vertical.

It should be remembered that if a gyroscope spinning freely about its spin axis and with complete freedom of motion about its other two mutually perpendicular axes has an external torque applied about one of the other axes, rotation about the other axis tends to precede rotation about the axis to which the torque is applied. But if the motion about the other axis is restrained then motion about the axis to which the torque is applied is direct and unrestrained by any gyroscopic effect.

Thus the most sensitive control of the gyroscope to maintain its desired gravity vertical position is to apply erecting torque to the other axis when erection is desired about one axis. This is the procedure in the present system during normal operation. The roll and pitch axes are the two mutually perpendicular axes and the roll axis is in the plane of the spin axis. The gyroscope wheel is kept spinning about the spin axis by an electric motor in the manner well known in the art and no part of this invention.

A torquing motor is applied to the pitch axis with the motor stator secured to the outer gimbal and the motor rotor secured to the wheel case or inner gimbal. The motor, called a pitch torquer, is a split single phase motor with both the main and secondary windings on the stator. The secondary windings are in duplicate, one for each direction of rotation and electrically phase shifted by series capacitors in the well known manner. A similar torquing motor called the roll torquer is applied to the roll axis with the stator secured to the gyroscope frame and the rotor secured to the outer gimbal.

In a plane perpendicular to the spin axis on top of the inner gimbal or case are secured four gravity sensitive switches of the rolling mercury type but specially made to be small and unusually sensitive. Two of these switches are called pitch sensing switches and are mounted to sense rotation of the case away from the vertical about the pitch axis. The other two are called roll sensing switches and are mounted to sense rotation of the case and the outer gimbal away from the vertical about the roll axis. Of each pair one switch closes on leaving the vertical in one direction and the other closes on leaving the vertical in the other direction. When at the gravity vertical position of the case about the particular axis both switches are open. The switches are connected with the torquing motors in such a way that, if for instance a roll sensing switch closes, the pitch torquer motor is energized to apply torque about the pitch axis in the direction to cause the case and outer gimbal to precess about the roll axis towards its gravity vertical position until the roll sensing switch opens. Similarly, if a pitch sensing switch closes, the roll torquer motor is energized to apply torque about the roll axis in the direction to cause the case to precess about the pitch axis towards its gravity vertical position until the pitch sensing switch opens.

Resistors are wired in the external circuits of the main windings of the torquing motors so that during normal operation less than line voltage is applied to the motors to limit the torquing forces applied.

When it is desired to allow the gyro to operate without restraint as a free gyro the supply lines to the torquer motors are opened.

After a maneuver in which the gyro has been allowed to run free and it is desired to bring it back to the gravity vertical position in a hurry, use is made of additional equipment provided. For this use means are provided to cut out the external resistance from the torquer motor supply line to give the torquer motor used a greater power impact to develop greater torquing force. A roll transfer switch is provided to transfer the roll sensing switch to control the roll torquer and a pitch transfer switch is provided to transfer the pitch sensing switch to control the pitch torquer.

A roll axis brake is provided for the roll axis and a pitch axis brake is provided for the pitch axis. These brakes are of the type shown and described in U. S. Patent No. 2,804,945 issued September 3, 1957 to Irwin B. Thierman on a Precision Brake. These brakes are double reverse band brakes in which a brake drum having two brake band grooves is banded by a pair of separate bands. One end of one band and the opposite end of the other band are anchored to the brake support. The other ends of the bands are connected respectively to a pair of solenoids spring biased to the brake-on position and actuated when energized to the brake released position.

The brake support for the roll axis brake is secured to the gyro frame and its drum is secured to the outer gimbal. The brake support for the pitch axis brake is secured to the outer gimbal and its drum is secured to the inner gimbal or case.

During normal operation of the gyroscope both solenoids of both brakes are continuously energized to hold the brakes out of operation. Means are provided for deenergizing the solenoids of one of the brakes to lock the gyro against rotation about that axis when the sensing switches of the other axis energize the torquer motor of the other axis. In other words during fast erection to the gravity vertical one pair of sensing switches are arranged simultaneously to start the torquer motor of the axis of the sensing switches and simultaneously to release to operative position the brake for the other axis. With the brake applied to the other axis the rigidity departs from the gyro and with full voltage applied to the torquer motor the gyro is quickly brought to the gravity vertical position about the axis of the sensing switch in control. If both pairs of sensing switches indicated divergence from the gravity vertical when the fast erection procedure is started obviously both torquers and both brakes could not be allowed to operate. The selection of which axis is first about which the gyro will be erected is random since means are provided by electrical interlocks to prevent the operation of the torquer and opposite axis brake combination controlled by one pair of sensing switches if the other gets started first. This interlocking means is provided by a roll brake relay and a pitch brake relay making up an essential part of the combination of the system of this invention.

Finally it should be noted that the gyro with which this control system is used has 360 degree freedom about the roll axis but only 82 degrees of freedom each side of its erect position about the pitch axis. Thus after a severe maneuver with the gyro released for free operation and the frame again righted the outer gimbal and case may be in an inverted position although the inner gimbal or case can never be inverted with respect to the outer gimbal. In other words if the gyro is torqued to the gravity vertical about the roll axis it will be in a position to be controlled in the usual manner by the sensing switches about the pitch axis. To take care of this condition a single pole double throw gravity controlled switch is mounted vertically on the outer gimbal and called an inversion recovery switch. In normal operation the closed side of this switch is connected in series with the current supply to the two pitch sensing switches and one of the roll sensing switches in parallel. When inverted the other side of the inversion recovery switch is connected in parallel with the other roll sensing switch so that at any time the gyro is inverted about the roll axis the inversion recovery switch takes control to energize the system to right the gyro about the roll axis. As soon as the gyro is righted to a point where the inversion recovery switch changes its throw the gyro is again under control of the normal erection controls to be erected by the normal process or the fast process whichever may be set for the purpose at the time.

How the above and other objects are attained and the operations above described are provided and explained in the following description referring to the attached drawings in which Fig. 1 shows schematically the apparatus and connections which make up the system.

Like reference numerals refer to like parts in the several figures of the drawings.

Figure 1:
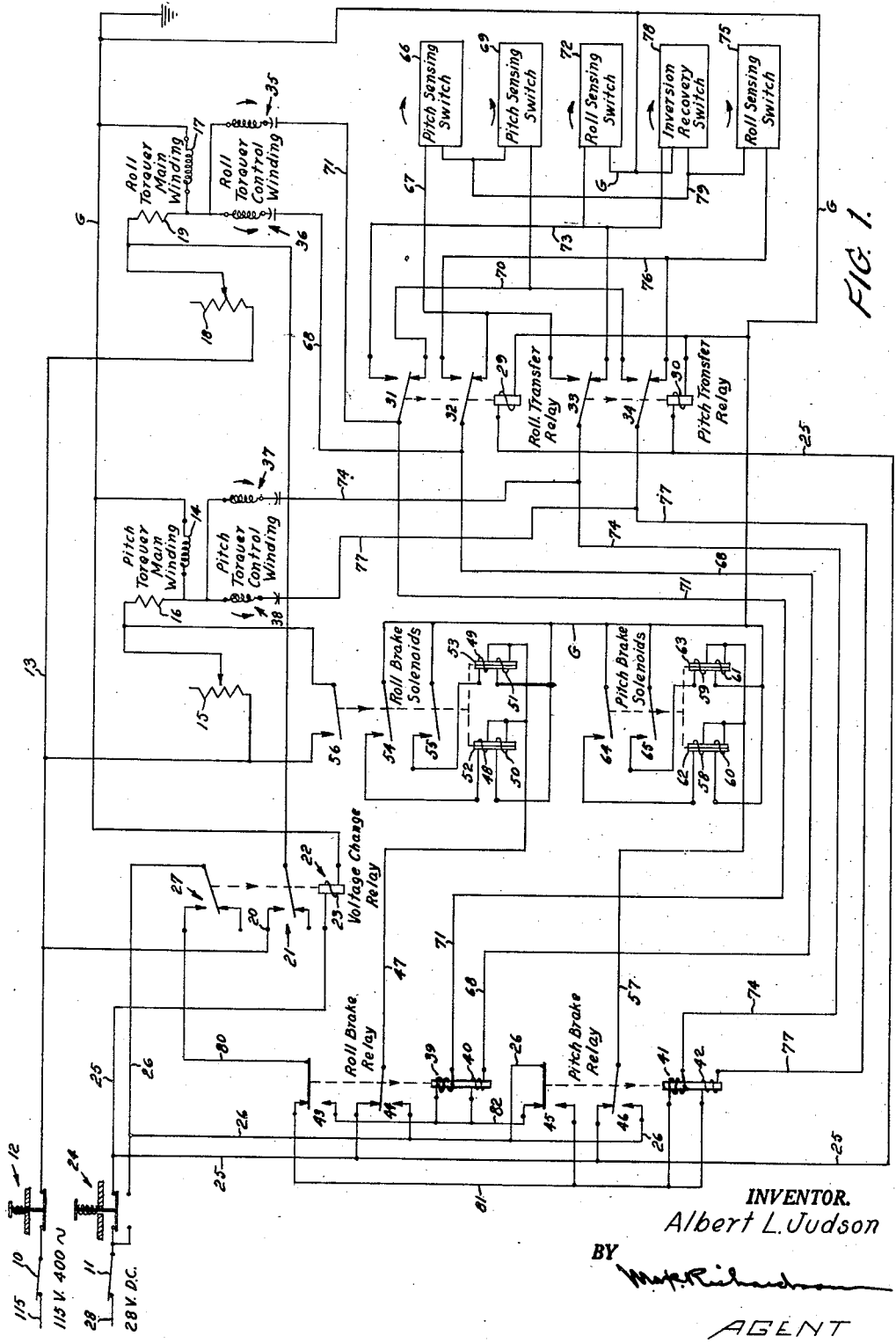

In referring now to the drawings it should be remembered that since the spin motor and its control, and the "pick-off" or "synchro" equipment used to transmit the information furnished by the gyro vertical, are well known parts with well known functions and not part of the erection system of this invention, these parts have been omitted from the drawing and description. It is to be assumed that the gyro wheel and spin motor are spinning at rated speed about the spin axis at all times.

Figure 2:
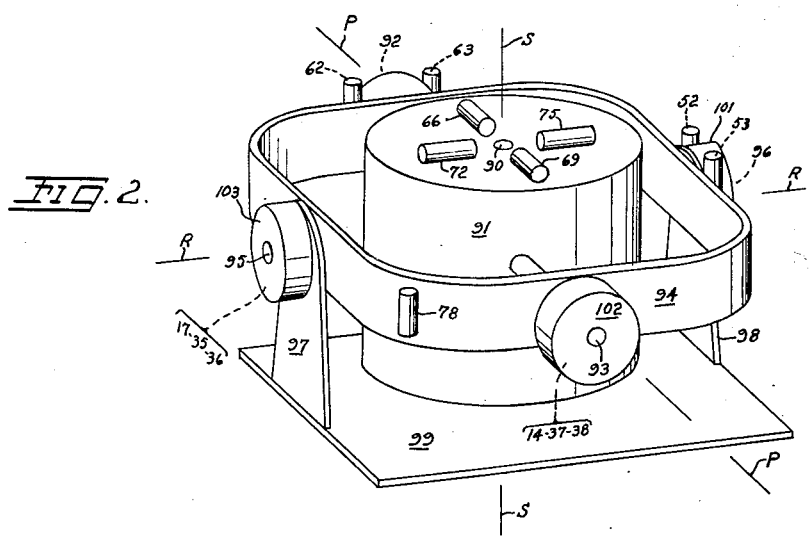
Fig. 2 is a simplified view in perspective of a gyroscope to which the system could be applied.
Figure 3:
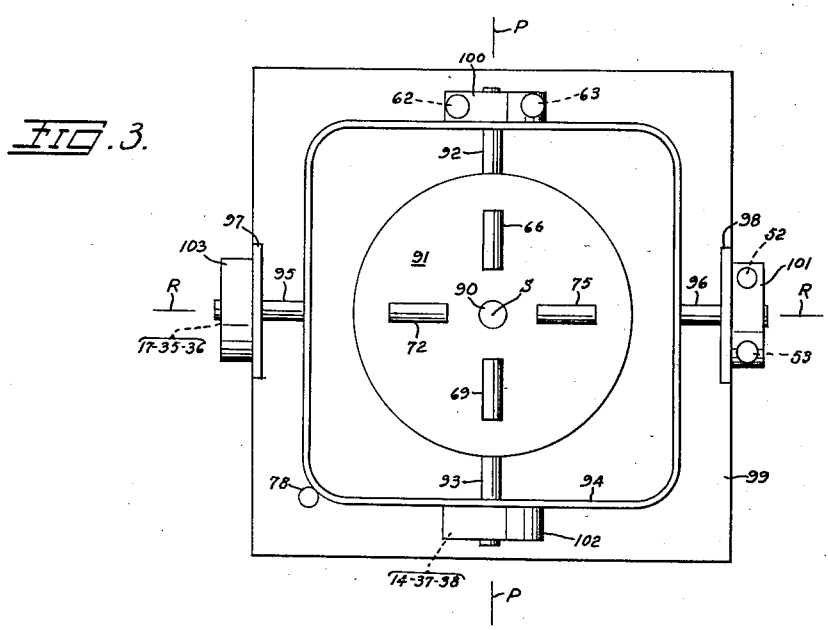
Fig. 3 is a plan view of the gyroscope of Fig. 2.

In Figs. 2 and 3 it will be seen that a typical gyroscope to which the present system could be applied would include a rotor, not shown, normally spinning about a vertical spin axis S—S on a shaft 90 carried by an inner gimbal ring or case 91 to which is secured a pair of shafts, 92, 93, rotatably carried on bearings, not shown, secured to outer gimbal ring 94 coaxial with axis P—P on opposite sides of case 91. Outer gimbal ring 94 is carried on its shafts 95, 96, rotatably carried in bearings, not shown, secured to standards, 97, 98, respectively, of stationary frame 99. Shafts 95, 96 are coaxial with axis R—R. Axes R—R and P—P are always perpendicular one to the other and axis S—S is always perpendicular to axis P—P. When the gyroscope is in its erected position axis S—S is also perpendicular to axis R—R.

Secured to the top of case 91 in a plane perpendicular to the spin axis S—S are a pair of pitch sensing electric switches 66, 69, and a pair of roll sensing electric switches 72, 75. Switches 66, 69 are also in a plane including axes S—S and P—P while switches 72, 75 are also in a plane including axes S—S and R—R. Secured to outer gimbal ring 94 is an inversion recovery switch 78 set perpendicularly to a plane including axes P—P and R—R.

Secured to the outer end of shaft 92 is a pitch brake drum, not shown, rotatably surrounded by a housing 100 for a pair of pitch brake bands and a pair of pitch brake solenoids 62, 63. Secured to the outer end of shaft 96 is a roll brake drum, not shown, rotatably surrounded by a housing 101 for a pair of roll brake bands and a pair of roll brake solenoids 52, 53. Housing 100 is secured to outer gimbal ring 94 and housing 101 is secured to standard 98 of frame 99.

Secured to the outer end of shaft 93 is the rotor not shown, of a pitch torquer motor rotatably surrounded by the rotor stator 102 secured to outer gimbal ring 94. Stator 102 includes a main winding 14 and opposite directional windings 37, 38. Secured to the outer end of shaft 95 is the rotor, not shown, of a roll torquer motor rotatably surrounded by the rotor stator 103 secured to standard 97 of frame 99. Stator 103 includes a main winding 17 and opposite directional windings 35 and 36.

As indicated in the drawing the erection system has two sources of electric power. One source, not shown, imposes a single phase alternating voltage of 115 volts at 400 cycles per second on line 115. The other source, not shown, imposes a direct current potential of 28 volts on line 28. In each case it is assumed that one terminal of each of the two power sources is connected to ground or line G in the drawing so that the full line potential in the one case is impressed between lines 115 and G, and in the other case between lines 28 and G. Switch 10 in line 115 and switch 11 in line 28 are disconnecting switches merely for the purpose of isolating the system from the power sources during test or repair.

Line 115 is connected through disconnecting switch 10 and manually operated spring return switch 12 to line 13 which energizes pitch torquer main winding 14 through adjustable resistance 15, resistance 16 and line G. Similarly line 13 energizes roll torquer main winding 17 through adjustable resistance 18, resistance 19 and line G. Line 13 is also connected to stationary contact 20 of switch 21 of voltage change relay 22 whose operating coil 23 is connected at one end to line G and at the other to line 28 through disconnecting switch 11, manually operated spring return switch 24 and line 25.

As previously explained all work of erection of the spin axis of the gyro to the desired gravity vertical position is done by the pitch and roll torquer motors whose windings are energized through switch 12 by line 115. Then when it is desired to allow the gyro to run "free" or without restraint from the torquer motors switch 12, called the free gyro switch, is held open to maintain both torquers in their unenergized condition.

Also, as previously explained, in normal or slow speed erection less than full voltage is applied to the torquer motors by the insertion between the torquer motors and line 13 of their respective resistances 15 and 18. This condition is controlled by "fast erection" switch 24 which in its normal position of spring return connects line 28 to line 25 and the erection system operates at normal rate. When switch 24 is depressed to connect line 28 to line 26 full voltage is put on the torquers and the method of fast erection by the use of brakes as previously explained comes into play.

First to consider the erection system during normal or slow erection with switch 24 connecting lines 28 and 25. With line 25 energizing coil 23 of voltage change relay 22 the armature is pulled downward as shown by the arrow and both switches 21 and 27 are in open position.

Roll transfer relay coil 29 and pitch transfer relay coil 30 are both seen to be energized between lines 25 and G. Their armatures are pulled downward and single pole double throw switches 31, 32, 33 and 34 are seen to be in their downward throw positions wherein switches 31 and 32 connect the two pitch sensing gravity controlled switches respectively with the reverse acting roll torquer control windings 35, 36, and switches 33 and 34 connect the two roll sensing gravity controlled switches respectively with the reverse acting pitch torquer control winding 37, 38, as shown.

Since neither of the operating coils 39, 40 of the roll brake relay nor operating coils 41, 42 of the pitch brake relay are energized, single pole double throw switches 43, 44, 45 and 46 are in their upward throw positions. Switch 44 through line 47 first energizes both the pull in coils 48, 49 and the holding coils 50, 51 of the respective roll brake solenoids 52, 53 but as soon as the solenoid coils are energized and their armatures pulled downward switches 54, 55 are opened to deenergize pull in coils 48, 49. Remembering that the roll brake solenoids 52, 53 respectively each have the duty when energized to hold out of application one of the two normally spring applied roll brake bands, then it is seen that with switch 44 closed all four coils 48, 49, 50 and 51 will be energized to pull the brake bands to their brake released position and then to open switches 54, 55 to deenergize coils 48, 49 since coils 50, 51 can hold the armatures in actuated position once they have been actuated. Under normal or slow erecting conditions we see that switch 44 is in its upward throw position and controls the roll brake solenoids to hold the roll brake ineffective and to hold switches 54, 55 and 56 in their downward throw or open positions. With switch 56 open as shown resistance 15 is in series with the pitch torquer windings to reduce the voltage applied thereto under normal or slow erecting conditions.

Switch 46 through line 57 first energizes both the pull in coils 58, 59 and the holding coils 60, 61 of the respective pitch brake solenoids 62, 63, but as soon as the solenoid coils are energized and their armatures pulled downward switches 64, 65 are opened to denergize pull in coils 58, 59. Remembering that the pitch brake solenoids 62, 63 respectively each have the duty when energized to hold out of application one of the two normally spring applied pitch brake bands, then it is seen that with switch 46 closed all four coils 58, 59, 60 and 61 will be energized to pull the pitch brake bands to their brake released position and then to open switches 64, 65 to deenergize coils 58, 59 since coils 60, 61 can hold the armatures in actuated position once they have been actuated. Under normal or slow erecting conditions we see that switch 46 is in its upward throw position and controls the pitch brake solenoids to hold the pitch brake ineffective and to hold switches 64, 65 in their downward throw or open positions.

As shown schematically in the drawing the system is set for normal or slow erection with the roll and pitch brakes held inoperative by the roll and pitch brake solenoids under control of the roll and pitch brake relays. Also with roll and pitch transfer relays actuated as shown to hold switches 31, 32, 33 and 34 in their down throw positions it is seen that gravity sensitive pitch sensing switch 66 when the spin axis is away from the gravity vertical in one direction about the pitch axis will energize roll torquer control winding 36 through line 67, switch 32 and line 68 to torque the outer gimbal about the roll axis to cause the inner gimbal to precess about the pitch axis towards the gravity vertical in the well known manner of gyroscopes.

Similarly gravity sensitive pitch sensing switch 69 when the spin axis is away from the gravity vertical in the other direction about the pitch axis will energize roll torquer control winding 35 through wire 70, switch 31 and line 71 to torque the outer gimbal about the roll axis to cause the inner gimbal to precess about the pitch axis towards the gravity vertical.

When the spin axis is away from the gravity vertical in one direction about the roll axis, gravity sensitive roll sensing switch 72 will energize pitch torquer control winding 37 through wire 73, switch 33 and wire 74 to torque the inner gimbal about the pitch axis to cause the outer gimbal to precess about the roll axis towards the gravity vertical. And when the spin axis is away from the gravity vertical in the other direction about the roll axis, gravity sensitive roll sensing switch 75 will energize pitch torquer control winding 38 through wire 76, switch 34 and wire 77 to torque the inner gimbal about the pitch axis to cause the outer gimbal to precess about the roll axis towards the gravity vertical.

As previously explained inversion recovery switch 78 is a single pole double throw gravity sensitive switch mounted on the outer gimbal with its axis perpendicular to the plane which includes the roll and pitch axes. Switch 78 will be in one of its throw positions when that end of the switch points above the horizon and in its other throw position when the other end of the switch points above the horizon. The throw of switch 78 which is closed when the spin axis is in its normal gravity vertical position connects line G through line 79 to one terminal each of switches 66, 69 and 75. One terminal of roll sensing switch 72 connects directly to line G. Thus when the spin axis is within 90 degrees of its normal gravity vertical position about either the pitch or roll axes, sensing switches 66, 69, 72 and 75 are effective for operation of the erection torquers as required. As previously noted the present gyroscope is constructed so that the inner gimbal or case has only about eighty-two degrees of freedom either side of its erected position about the pitch axis but the outer gimbal has a full 360 degrees of freedom about the roll axis. Therefor it is possible for the outer gimbal to become inverted about the roll axis at which time also the spin axis will be inverted. To correct this situation when it occurs the other throw of inversion recovery switch connects directly to line 73 or in parallel with roll sensing switch 72 to operate the erection system about the roll axis until inversion recovery switch 78 is operated to the normal throw which it maintains when the spin axis is less than ninety degrees from its normal gravity vertical position.

From the system condition as shown in the drawing and with the foregoing explanation it is seen that in the normal or slow speed system of erection no brakes are used and the pitch and roll sensing switches operate respectively on the roll and pitch torquers to precess the gyro about the pitch and roll axes towards the gravity vertical position of the spin axis. During rapid acceleration if desired the gyro can be allowed to run free by holding switch 12 open to deenergize the torquers. And should the gyro become inverted about the roll axis the inversion recovery switch 78 takes control of the system until the inversion about the roll axis is overcome.

After a maneuver involving unusual accelerations and free gyro operation it may be desirable to bring the spin axis of the gyro back to its gravity vertical position at a rapid rate. The means and method of rapidly erecting the gyroscope is an important part of this invention. To set the means for rapid erection into operation, switch 24 is depressed for a sufficient length of time to complete the erection of the spin axis to its gravity vertical position.

When switch 24 is depressed line 25 is disconnected from line 28 and line 26 is connected to line 28. Deenergizing line 25 deenergizes coil 23 of the voltage change relay, coil 29 of the roll transfer relay and coil 30 of the pitch transfer relay. Switches 27, 21, 31, 32, 33 and 34 are released to their upward throw positions.

Switch 21 short circuits resistance 18 to put full voltage on the roll torquer winding.

Switch 31 puts roll torquer control winding 35 under control of roll sensing switch 72.

Switch 32 puts roll torquer control winding 36 under control of roll sensing switch 75.

Switch 33 puts pitch torquer control winding 37 under control of pitch sensing switch 66.

Switch 34 puts pitch torquer control winding 38 under control of pitch sensing switch 69.

Switch 27 energizes line 80 from line 26 and line 81 through switch 43 from line 80.

Deenergizing line 25 deenergizes lines 47 and 57 and therefore deenergizes brake solenoid coils 50, 51 and 60, 61 release the roll and pitch brakes to actuated condition. Thus both roll and pitch axis brakes are set and switches 54, 55, 56, 64 and 65 are closed. Switch 56 short circuits resistance 15 to put full voltage on the pitch torquer winding.

The system is now as it would be after completion of fast erection with switch 24 held down and all of the sensing switches 66, 69, 72 and 75 in open position because the gyroscope is in its gravity vertical position.

Now assume that the fast erection switch 24 has just been depressed to start the fast erection process and the gyroscope is off the gravity vertical about both the pitch and roll axes. Or, assume that both pitch sensing switch 66 and roll sensing switch 72 are closed.

With pitch sensing switch 66 closed, pitch torquer control winding 37 is energized through line 67, switch 33 and line 74. Also line 74 energizes pitch brake relay coil 41 through line 81 and the pitch brake relay is actuated to the down throw positions of switches 45, 46. Switch 46 energizes line 57 from line 26 and actuates both pitch brake solenoids to release the pitch brake for free movement of the inner gimbal about the pitch axis. Switch 45 closes downward to connect lines 26 and 81 and isolate line 82 from line 26. With line 82 isolated it is not possible for roll sensing switch 72 through line 73, switch 31 and line 71 to energize roll brake relay coil 39 to actuate switch 44 to energize line 47 to actuate coils 48 to 51 to operates the roll brake solenoids to release the roll brake.

It should be noted that if the roll sensing switch 72 is assumed to be closed before pitch sensing switch 66 then roll torquer control winding 35 will be energized through line 73, switch 31 and line 71 and since it is assumed that the pitch brake relay has not operated, roll brake relay coil 39 will be energized between line 71 and line 26 through line 82 and switch 45 in its upward throw position. Actuation of the roll brake relay by coil 39 moves switches 43 and 44 to their down throw positions isolating line 81 to prevent the operation of the pitch brake relay and energizing line 47 to actuate the roll brake solenoid coils to loosen the roll brakes.

From the above it is seen that if both a pitch sensing switch and a roll sensing switch close at about the same time the one that will take control and complete its step of high speed erection will be the one which first actuates its brake relay for if the pitch brake relay is actuated the pitch brake solenoids will be operated to free the pitch brake and the roll brake relay will have its operating coils isolated so the relay cannot operate to free the roll brake, and vice versa if the roll brake relay is first actuated.

It should be noted that each of the brake relays have two operating coils of equal strength and used one at a time since for instance, the pitch brake relay must be similarly operated to do the same thing regardless of which of the pitch sensing switches and which of the pitch torquer control windings are used.

It should also be noted that when the gyro is in its gravity vertical position about one of the axes, say the pitch axis, and the gyroscope is being accelerated or vibrated in space, it is possible that the mercury in both of the pitch axis sensing switches may be displaced to close both of the switches at once to try to operate the appropriate brake relay. To avoid this situation coils 39, 49 of the roll brake relay are wound of opposite hand and coils 41, 42 of the pitch brake relay are wound of opposite hand. If both coils of one relay are energized at the same time one coil neutralizes the other and the relay will not operate, thus a gravity vertical position is sensed even though the movement of the gyro in space is violent enough to close both the sensing switches of one axis.

From the above it is seen that when fast erection of the gyroscope is desired manual button 24 is held down with the result that full voltage is put on the torquers and the appropriate sensing switches operate to energize the selected control windings of the torquers. At the same time that the appropriate sensing switches energize their respective torquer control windings they attempt to actuate their respective brake relays but as shown above only one brake relay can be actuated at a time for when one is actuated it opens the actuation circuit of the other. Thus one brake relay is actuated and actuates the solenoids of its respective brake to release its brake. While the other brake remains applied to prevent motion of the gyro about that axis the torquer of the axis whose brake is released torques the gyro to the gravity vertical about the free axis and the sensing switch opens to de-activate the torquer and the brake solenoids. Thus when the sensing switch that was first to activate its brake relay has held its torquer and brake solenoids energized until the sensing switch itself opens and its torquer and brake solenoids are de-energized and its brake is applied. The sensing switch of the other axis whose torquer control winding is already activated is now able to activate its brake relay to activate its brake solenoids to release its brake to allow its torquer to erect the gyro to the gravity vertical about this axis.

In fast erection it is seen that a sensing switch of one axis takes control if it happens to be first to activate its brake relay and when this sensing switch has taken control it keeps control until the gyro is erected to the gravity vertical about that axis and the sensing switch is opened. When the sensing switch opens and the brake relay is deactivated one of the sensing switches of the other axis immediately will take control and erect the gyro to the gravity vertical about this other axis at which time that sensing switch opens. It is thus seen that in fast erection a sensing switch activates the appropriate torquer control winding of the sensing switch axis and at the same time activates the solenoids of the brake of the same axis until the sensing switch is opened. Then a sensing switch of the other axis can repeat the operation until it opens. Then again a sensing switch of the first axis can repeat. As long as switch 24 is held down the sensing switches of the two axes (roll and pitch) will alternately be in position to erect the gyro about the two axes.

It should also be noticed that with fast erection, as was shown to be the case with slow or normal erection, if the gyroscope is inverted about the roll axis the inversion recovery switch 78 in cooperation with roll sensing switch 72 takes control to erect the gyro about the roll axis before releasing the gyro for erection about the pitch axis.

Having thus noted a principal object of this invention, illustrated and described a preferred form in which the invention may be practiced, and explained its operation, I claim:

1. A gravity vertical erection system for a gyroscope having a wheel supported for rotation about a vertical spin axis in an inner gimbal supported for rotary movement about a pitch axis normal to said spin axis in an outer gimbal supported for rotary movement in a frame about a roll axis normal to said pitch axis in a plane including said spin axis, said system including a first normally open gravity responsive electric switch adapted to close on movement of said spin axis away from its gravity vertical position in a first direction about said pitch axis, a second normally open gravity responsive electric switch adapted to close on movement of said spin axis away from its gravity vertical position in a second direction about said pitch axis, a third normally open gravity responsive electric switch adapted to close on movement of said spin axis away from its gravity vertical position in a third direction about said roll axis, a fourth normally open gravity responsive electric switch adapted to close on movement of said spin axis away from its gravity vertical position in a fourth direction about said roll axis, a pitch axis brake resiliently biased to its applied position to prevent rotation of said inner gimbal about said pitch axis, a pitch brake solenoid means adapted when energized to release said pitch axis brake, a roll axis brake resiliently biased to its applied position to prevent rotation of said outer gimbal about said roll axis, a roll brake solenoid means adapted when energized to release said roll axis brake, a first motor means adapted when energized to urge said inner gimbal to rotate in said second direction about said pitch axis, a second motor means adapted when energized to urge said inner gimbal to rotate in said first direction about said pitch axis, a third motor means adapted when energized to urge said outer gimbal to rotate in said fourth direction about said roll axis, a fourth motor means adapted when energized to urge said outer gimbal to rotate in said third direction about said roll axis, a double throw electric switch biased to a first throw position and operable to a second throw position and circuit means adapted when said double throw switch is in its said first throw position to energize both said brake solenoid means to restore said gyroscope to freedom of motion about both said pitch axis and said roll axis and when said first or said second gravity responsive switch is closed to energize said third or said fourth motor means to urge said outer gimbal towards rotation about said roll axis to precess said inner gimbal about said pitch axis towards the gravity vertical position of said spin axis.

2. The gyroscope erection system of claim 1 in which when said double throw switch is in its said first throw position and when said third or said fourth gravity responsive switch is closed said circuit means will energize said first or said second motor means to urge said inner gimbal towards rotation about said pitch axis to precess said outer gimbal about said roll axis towards the gravity vertical position of said spin axis.

3. The gyroscope erection system of claim 2 in which when said double throw switch is in its said second throw position and said spin axis is in its gravity vertical position all said gravity responsive switches will be open, both said brake solenoid means will be deenergized by said circuit means and both said brakes will be applied by their respective resilient biasing means.

4. The gyroscope erection system of claim 3 in which when said double throw switch is in its said second throw position and said first or said second gravity responsive switch is closed said pitch brake solenoid means will be energized by said circuit means to release said pitch axis brake and either said first or said second motor means will be energized to rotate said inner gimbal towards its gravity vertical position about said pitch axis.

5. The gyroscope erection system of claim 4 in which when said double throw switch is in its second throw position and said third and said fourth gravity responsive switches are closed said roll brake solenoid means will be energized by said circuit means to release said roll axis brake and either said third or said fourth motor means will be energized to rotate said outer gimbal towards its gravity vertical position about said roll axis.

6. The gyroscope erection system of claim 2 including a double throw gravity responsive switch having a first throw position and a second throw position, said double throw gravity responsive switch being carried on said outer gimbal to be in its said first throw position when said spin axis is within ninety degrees of its gravity vertical position and in its said second throw position when said spin axis is more than ninety degrees from its gravity vertical position and said circuit means including means connecting said first throw position of said double throw gravity responsive switch in series with three of said previously mentioned gravity responsive switches and said second throw position in parallel with the remaining one of said previously mentioned gravity responsive switches whereby when said spin axis is more than ninety degrees from its gravity vertical position said second throw of said double throw gravity responsive switch and said remaining one of said previously mentioned gravity responsive switches will sequentially energize one of said motor means to erect said spin axis about one of said roll or said pitch axes.

7. The gyroscope erection system of claim 5 including a double throw gravity responsive switch having a first throw position and a second throw position, said double throw gravity responsive switch being carried on said outer gimbal to be in its said first throw position when said spin axis is within ninety degrees of its gravity vertical position and in its second throw position when said spin axis is more than ninety degrees from its gravity vertical position and said circuit means including means connecting said first throw position of said double throw gravity responsive switch in series with three of said previously mentioned gravity responsive switches and said second throw position in parallel with the remaining one of said previously mentioned gravity responsive switches whereby when said spin axis is more than ninety degrees from its gravity vertical position said second throw of said double throw gravity responsive switch and said remaining one of said previously mentioned gravity responsive switches will sequentially energize one of said motor means to erect said spin axis about one of said roll or said pitch axes.

8. A gravity vertical erection system for a gyroscope having a wheel supported for rotation about a vertical spin axis in an inner gimbal supported for rotary movement about a pitch axis normal to said spin axis in an outer gimbal supported for rotary movement in a frame about a roll axis normal to said pitch axis in a plane including said spin axis, said system including gravity responsive switch means for selective closure on movement of said spin axis away from its gravity vertical position in either direction about either of said pitch or roll axes, motor means selectively responsive to said gravity responsive switch means for urging said spin axis towards its gravity vertical position, a pitch axis brake having an applied position of locking said inner gimbal against movement about said pitch axis and a released position, a roll axis brake having an applied position of locking said outer gimbal against movement about said roll axis and a released position, a double throw switch and circuit means responsive to one throw of said double throw switch to actuate both said brakes to their released positions and when said spin axis is away from its gravity vertical position about one of said pitch or roll axes selectively to energize said motor means of said other of said pitch or roll axes from said gravity responsive switch means of said one of said pitch or roll axes to precess said spin axis about said one of said pitch or roll axes to said gravity vertical position.

9. The gyroscope erection system of claim 8 in which when said spin axis is in its gravity vertical position and said double throw switch is in its other throw position said circuit means is ineffective to release said brakes but when said spin axis is away from its gravity vertical position about one of said pitch or said roll axes and said double throw switch is in its other throw position said brake of said one axis will be released and said motor means will be selectively energized through said circuit means by said gravity responsive switch means to urge said spin axis towards its gravity vertical position about said one axis.

References Cited in the file of this patent

UNITED STATES PATENTS

| | | |
|---|---|---|
| 2,542,975 | Adkins | Feb. 27, 1951 |
| 2,607,231 | Schoeppel et al. | Aug. 19, 1952 |
| 2,720,116 | Furst | Oct. 11, 1955 |